Patented Nov. 11, 1941

2,262,739

UNITED STATES PATENT OFFICE 2,262,739

COMPOSITION OF MATTER AND PROCESS FOR PREVENTING WATER-IN-OIL TYPE EMULSIONS RESULTING FROM ACIDIZATION OF CALCAREOUS OIL-BEARING STRATA

Melvin De Groote, University City, Mo., assignor to Petrolite Corporation, Ltd., Wilmington, Del., a corporation of Delaware No Drawing. Application October 11, 1940, Serial No. 360,802

34 Claims. (Cl. 166—21)

This invention relates to the art or procedure commonly referred to as acidization of oil-bearing calcareous strata or the like, and which consists in introducing a strong mineral acid into an oil well for the purpose of causing the acid to disintegrate, dissolve, or react with the calcareous oil-bearing structure of the well, in a manner that results in an increase in the amount of crude petroleum obtained from the oil-bearing strata.

Many oil wells, after being subjected to acidization, produce emulsions, frequently of a very refractory nature, that have to be demulsified or subjected to chemical, electrical, or similar treatment, in order to recover the oil or valuable constituent of the emulsion. My invention has for its main object to prevent the formation of objectionable water-in-oil type emulsions resulting from acidization of oil wells; or stated in another way, one object of my invention is to provide a process or procedure by which the oil-bearing calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipe lines and refineries. Such refractory emulsions which often follow conventional acidization, represent a transitory, rather than a permanent situation; but even if lasting only for a few weeks, they are extremely objectionable.

Another object of my invention is to provide a new composition of matter that is particularly adapted for use in the operation of acidizing the calcareous structure in a way to increase the amount of crude petroleum obtainable from said structure, without, however, converting said crude petroleum into an objectionable emulsion.

My new process, briefly stated, consists in causing an emulsion-preventing agent of the kind hereinafter described, to be mixed with, dissolved in, or commingled with the fluids, liquids, or liquid mixture in an oil well that has been subjected to or which is being subjected to acidization, prior to emergence of said fluids, liquids, or liquid mixtures from the well. Said emulsion-preventing agent consists of a chemical compound or condensation product derived from the following reactants: a high molal, water-insoluble alcohol having at least nine carbon atoms and may have as many as 31 or more carbon atoms; and a hydroxylated polyamine containing at least one amino nitrogen atom not directly linked to a hydroxy hydrocarbon radical, and preferably, at least two such nitrogen atoms free from direct linkage with a hydroxy hydrocarbon radical.

Such reactants are mixed in the proportion so that there is at least one mole of a high molal alcohol for each mol of the hydroxylated polyamine. The condensation process consists essentially in heating the mixture at a temperature of about 200° C. or higher, but below the decomposition point of the resulting hydrotropic material, and is conducted so as to effect such condensation between the reactants. The maximum temperature generally employable is about 300° C. The preferred range is about 235–300° C.; and in a general way, 250–275° C. represents an optimum range for a variety of the reactants employed. The reaction is conducted in absence of a catalyst. It has been found that the type of catalyst which hastens reaction is apt to produce rapid polymerization of the hydroxylated amine. The condensation product of a high molal alcohol and a polymerized hydroxylated amine represents a type of material not contemplated in the present instance, but is contemplated for similar purposes in my co-pending application for patent Serial Number 360,803, filed October 11, 1940.

The specific composition of the condensation products obtained in the manner briefly outlined above is unknown, although in a general way ethereal linkages must be involved. For this reason many of the properties of the materials are unpredictable. It is surprising to find that such materials are stable for an extended period of time in half-concentrated hydrochloric acid or other similar mineral acids. It is likewise remarkable to note that such solutions in acid, and particularly in relatively low ratios, as hereinafter described, give a very pronounced lowering of the surface tension. This is especially true in such compounds or condensation products that are derived at relatively high temperatures, and especially if derived from polyamino reactants having at least two amino nitrogen atoms not directly attached to a hydroxy hydrocarbon radical.

In practising my process the said emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground, but the particular procedure, the means used to effect the mixing or commingling of said emulsion-preventing agent with the well fluids or liquids, and the particular time when said mixing is effected, are immaterial, so long as said emulsion-preventing agent becomes mixed with, dissolved in, or commingled with the cognate fluids of the well or the liquids or liquid mixture resulting from the acidization operation (the oil and the reaction product of the mineral acid on the calcareous structure), prior to emergence from the well. Equally good results may be obtained by the following procedure, to wit:

(a) Introducing the emulsion-preventing agent, preferably in aqueous solution, prior to the introduction of the mineral acid into the well;

(b) Introducing the emulsion-preventing agent along with the mineral acid, i. e., dissolved in said acid; and (c) Introducing the emulsion-preventing agent, preferably in equeous solution, immediately after the introduction of the mineral acid.

The composition of matter that I have devised for acidizing the calcareous oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. My preference is to use hydrochloric acid whose concentration is at least equal to approximately half strength commercial 18 Bé. acid, as I have found that when such an acid is mixed with approximately 0.01% to 2.5% of the herein contemplated emulsion-preventing agent or agents, one obtains a new composition of matter that is perfectly stable and homogeneous, and which exhibits unusual properties, particularly when said acid mixture or new composition of matter is employed in the acidization of oil-bearing strata. However, I wish it to be understood that my invention, i. e., the process and composition of matter herein described, is not restricted to the use of hydrochloric acid, but instead contemplates the use of any suitable strong mineral acid, several of which have previously been described as being usable in place of hydrochloric acid. Similarly, I wish it to be understood that the new composition of matter herein described may have other or additional uses, such, for example, as in the acidization of oil-bearing strata, which do not produce emulsions. The hydrochloric acid or the like that is employed may or may not have present other addition agents intended to make the acid particularly adapted to most localized conditions, which sometimes arise in the course of acidization. It should be emphasized that what is said hereinafter as to the utility and effectiveness of the composition of matter herein contemplated, applies with equal force and effect to the process which forms part of the present invention.

A number of problems have been involved in the introduction of strong mineral acid into oil-bearing strata of the kind containing calcium carbonate, magnesium carbonate, mixtures of same, with siliceous material, or material which is dolomitic in character, and commonly referred to as calcareous structures. One problem is the prevention of corrosion, or damage to the metallic working parts of the well into which the acid is introduced. This has been overcome in various ways, such as by the use of an inhibitor. For the sake of brevity, reference is made to the following patents which give a cross-sectional view of the art related to acidization, although there are in addition certain other practical elements which are well known: U. S. Patent Nos. 1,877,504, dated Sept. 13, 1932, Grebe and Sanford; 1,891,667, dated Dec. 20, 1932, Carr; 1,911,446, dated May 20, 1933, Grebe and Sanford; 1,990,969, dated Feb. 12, 1935, Wilson; 2,011,579, dated Aug. 20, 1935, Heath and Fry; 2,024,718, dated Dec. 17, 1935, Chamberlain; 2,038,956, dated Apr. 28, 1936, Parkhurst; 2,053,285, dated Sept. 8, 1936, Grebe; 2,128,160 and 2,128,161, dated Aug. 23, 1938, Morgan, and 2,161,085, dated June 6, 1939, Phelan.

As has been previously stated, in the acidization of oil-bearing calcareous strata or the like, it has been found necessary, in some instances, to add certain other materials or compounds which give additional desirable effects, at least under certain conditions. For instance, hydrofluoric acid or fluorides, have been added to intensify the action of the hydrochloric acid used to treat the well. Possibly this is related to the action on siliceous matter in the calcareous structure. The reason for the addition of inhibitors has been previously indicated. Sometimes it has been desirable to add tenacious foam-producing agents, such as glue, gelatin, or the like. In other instances, it has been desirable to add calcium sequestering compounds, such as sodium hexametaphosphate. In other instances reducing agents have been added to keep any dissolved iron salts in the ferrous state. Isopropyl alcohol or the like is sometimes added as a surface tension depressant. Thus, the addition of various other auxiliary agents, commonly referred to as addition agents, is well known.

I have found that the materials or products which I contemplate adding to the hydrochloric acid or the like to produce my new composition of matter, or to act as an emulsion-preventing agent in my new process, do not interfere in any manner with the functional effect of other conventional acidizing addition agents. Of course, any single example may contain no additional agent at all; it may contain one or more, depending upon the particular local conditions and use. As far as I am aware, the herein-contemplated compounds which are added to hydrochloric acid, or any other suitable mineral acid, such as a mixture of hydrochloric acid and hydrofluoric acid, do not replace other addition agents which have been added for various other purposes. For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions, when an oil well is turned into production after the acidizing operation. Many oil wells are acidized without subsequently producing any emulsions; or the emulsions, if produced, are self-resolving or readily susceptible to any moderate breaking action. However, certain wells, particularly those located in western Kansas and certain wells in Illinois, when acidized by conventional processes, yield particularly refractory emulsions. This is a rather surprising situation, insofar that the spent acid results in a solution having approximately 20% of calcium chloride present, and having a pH value of approximately 3.5 to 5. One would expect the increased acidity over that of most natural brines to decrease the stability of the emulsion. One would also expect that the increased electrolyte content of the dispersed phase would decrease the stability of the emulsion. The increased specific gravity differential should have a similar de-stabilizing effect. Actually, in a number of instances this is not the case, and such emulsions have resulted in unsual problems. In its broadest aspect, then, the agents herein contemplated may be used simply as emulsion-preventers, in connection with the acidization of subterranean strata.

The most concentrated hydrochloric acid, ordinarily available, is about 36% HCl strength. The commercial acid of this strength or somewhat weaker, is usually diluted with an equal quantity of water before it is used for acidization; i. e., the acid used in acidization may vary from 14% to 16.5% HCl, although acid varying in strength from 5% to 20% HCl has been employed. It is entirely feasible to add an agent to the acid as produced at the point of manufacture, thus exemplifying the composition of matter feature of the present invention. For instance, if desired, 0.02% to 5% of the contemplated agent may be added to the concentrated hydrochloric acid in manufacture. Such acid can be diluted to a suitable point before being employed in the acidization process. Thus, such concentrated acid can be diluted, for instance, half and half, so that the reagent is present in the dilute product within the ratio suggested previously, to wit: 0.01% and 2.5%. In many instances, the use of between 0.05% and 0.5% represents an acceptable average range.

In actual practice the hydrochloric acid obtained by a person or firm responsible for acidizing operations, may be used, in some instances, on oil-bearing strata, which do not form severe or refractory emulsions, and thus no advantage is obtained by adding a composition of the kind herein contemplated in comparison with ordinary acid. Then too, some calcareous oil-bearing strata which produces severe emulsions, may require more or less of the agent of the kind herein contemplated than would be necessary in some other strata. For this reason, in the practical aspect it is generally desirable to add the agent of the kind herein contemplated to the dilute acid, so as to be suitable for the specific local conditions which require treatment. The suitable range of ratios for ordinary half-strength acid has been indicated.

As has been previously suggested, one may also add to the acid intended for acidization, various other reagents or addition products of the kind described in the aforementioned list of patents, without affecting the operation of the emulsion-preventing agent that I employ, and without danger of said emulsion-preventing agent interfering with the effectiveness of such other acidization addition products. Likewise, it has been indicated that the need not necessarily employ my emulsion-preventing agent in the form of an addition agent, which is added to or mixed with the acid used in the acidizing step. Instead, my emulsion-preventing agent may be introduced in suitable aqueous solution, preferably in fairly concentrated solution, for instance, 1-5%, prior to the acidizing step, or immediately after the acidizing step. The method of introduction is, of course, any conventional method, and preferably, employs the same apparatus and procedure used for introducing the acid. For convenience, however, and in the most preferred form, my invention is exemplified by employing as an integral part thereof the composition of matter herein contemplated, to wit, hydrochloric acid or the like, containing in stable admixture, agents of the kind subsequently to be described and within the percentage range indicated.

The ineffectiveness of most ordinary demulsifiers for preventing the formation of water-in-oil type emulsions resulting from acidization, is readily understandable. Ordinary demulsifiers either are not soluble in half-strength hydrochloric acid, or its equivalent, or they are not soluble in spent brine of the kind previously mentioned, i. e., brine containing roughly the equivalent of 20% of calcium chloride, and having a pH of 3.5 to 5. Furthermore, if soluble at all, they are generally decomposed; and if they do not decompose under ordinary conditions, they at least decompose under the conditions which involve the necessary pressure employed in acidization. Then too, in some instances where such demulsifiers appear to meet all other requirements, they apparently precipitate out on the face of the pay sand or oil-bearing strata, and may even reduce instead of increase the oil production, as compared with results obtained by ordinary acid. There are a number of other reasons not necessary to explain, which prevent ordinary demulsifiers from being effective. It is possible that the characteristic properties of a new composition of matter herein described, make it adaptable for use in other arts with which I am not acquainted; but it may be apparent to others. It is also possible that the stable mixture of the kind described, i. e., certain agents dissolved in strong mineral acid, have other properties which I have not investigated, and in view of such properties, such mixture is particularly adaptable for the particular use herein described.

As has been previously indicated, one class of reactants employed as a raw material in the manufacture of the herein contemplated emulsion-preventing agent, is the class of high molal water-insoluble alcohols. Such high molal alcohols are well known compounds, and the method of producing or obtaining the same is common knowledge. Briefly stated, such high molal alcohols may be aliphatic, alicyclic, or cyclo-aliphatic in nature. They may be primary, secondary, or tertiary alcohols, and may be saturated or unsaturated. They may be derived from different sources. Some of the alcohols occur in nature as a constituent of naturally-occurring waxes. Such alcohols include the following: cetyl alcohol, octtadecyl alcohol, arachyl alcohol, carnaubyl alcohol, ceryl alcohol, myricyl alcohol, pisangceryl alcohol. Other alcohols are obtained from natural fats (vegetable or animal oils or fats) and from waxes, by reduction or other processes. Examples of suitable materials for use as reduction reactants are tallow, sperm oil, cocoanut oil, etc. Such alcohols are frequently designated by indicating the source of fatty acids or the like from which they are obtained. Thus, they may be referred to as oleyl alcohol, stearyl alcohol, ricinoleyl, etc. The same procedure which is employed in connection with the conversion of fatty acids or their esters to alcohols, is also applicable to somewhat kindred monocarboxy acids or esters, such as naphthenic acid, abietic acid, and the like; and thus there are available corresponding naphthenyl alcohols, abietyl alcohols, etc. Water-insoluble cycloaliphatic alcohols are obtained in various ways, including reactions between a phenolic body and an alkylene oxide, such as ethylene oxide, or between a phenolate and a monochlorhydrin, or the like. Alcohols somewhat similar to abietyl alcohols, and sometimes referred to as resin alcohols, are derived from resins, such as dammar, copal, etc. The alcohols may have straight chains or branch chains.

Examples include nonyl alcohol, decyl alcohol, dodecyl alcohol, tetradecyl alcohol, hexadecyl alcohol, octadecyl alcohol, and the like.

Another class of alcohols is derived from oxidized petroleum, which consists predominantly of secondary aliphatic alcohols contained in a range of about 9–28 carbon atoms per molecule. See U. S. Patent No. 1,909,295, dated May 16, 1933, to Luther et al. See also U. S. Patent No. 2,108,756, dated February 15, 1938, to McAllister. As to a number of alcohols containing 9–25 carbon atoms and which represent secondary alcohols of the branch chain type, see U. S. Patent No. 2,088,020, dated July 27, 1937, to Wickert. As to other suitable high molal tertiary alcohols, reference is made to U. S. Patent No. 2,084,253, dated June 15, 1937, to Hintermaier. As to certain cycloaliphatic alcohols, see U. S. Patent No. 2,174,131, dated September 26, 1939, to Lubs.

As to unsaturated alcohols, for example, attention is directed to those which occur naturally as a constituent of sperm oil or the like, and further reference is made to U. S. Patent No. 2,199,403, dated May 7, 1940, to Henk et al.

The second class of raw materials employed as reactants are the hydroxylated polyamines, characterized by the presence of at least one amino nitrogen atom not directly attached to a hydroxy hydrocarbon radical, are well known compounds. They may be obtained in various ways. The commonest procedure is to treat a polyamine with an alkylene oxide or its equivalent, such as ethylene oxide, propylene oxide, glycidol, or the like. The commoner polyamines which can be so treated with an oxy-alkylating agent include the following: ethylene diamine; diethylene triamine; triethylene tetramine; tetraethylene pentamine; pentaethylenehexamine; propylene diamine; dipropylene triamine; tripropylene tetramine; tetrapropylene pentamine; pentapropylene hexamine, etc. In some instances such amines may be treated with an alkylating agent or the like so as to introduce an alkyl, aralkyl, or alicyclic radical into the compound as a substitute for an amino hydrogen atom. For instance, one may obtain diethyl tetraethylene pentamine in the conventional manner using ethyl iodide or the like as an alkylating agent.

In any event, having selected a suitable polyamine, the product is then treated with any acceptable oxy-alkylating agent, such as ethylene oxide, propylene oxide, and the like. In view of the lower cost of ethylene oxide and in view of its greater activity, it is most frequently employed. For instance, ethylene diamine can be treated with one mole of ethylene oxide to produce hydroxy ethylene diamine. Diethylene triamine can be treated with three moles of ethylene oxide so as to yield triethanol diethylene triamine. Triethylene tetramine can be treated with four moles of ethylene oxide to yield tetraethanol triethylene tetramine. Similarly, one can obtain tetraethanol tetraethylene pentamine, or tetraethanol pentaethylene hexamine. One can employ propylene oxide or glycidol to give similar products. In view of the fact that the most inexpensive polyamine now available is tetraethylene pentamine, I prefer to treat tetraethylene pentamine with three moles of ethylene oxide, four moles of ethylene oxide, or five moles of ethylene oxide, to give the corresponding triethanol, tetraethanol, and pentaethanol derivatives, and to employ such derivatives.

The condensation products employed are manufactured by a simple heat condensation process. The mixture of the two classes of reactants is subjected to a temperature sufficient to produce the desired condensation. Condensation usually starts at a temperature somewhere above 200° C. and takes place with a reasonable rapidity at the higher ranges previously indicated. Sometimes a temperature as high as 325° C. or thereabouts may be employed, provided that decomposition does not take place. I have found it most desirable to use aliphatic alcohols rather than cycloaliphatic or alicyclic alcohols. Moreover, I have found that the primary alcohols react much more rapidly, as a rule, than the secondary or tertiary alcohols. My preference is to use aliphatic primary alcohols having approximately 10–22 carbon atoms. My preference is to introduce only one alcohol residue for each polyamine employed; but in many instances it is possible to introduce at least two and possibly three alcohol radicals for each mol of amine, particularly when such amine is highly hydroxylated, such as, for example, hexaethanol tetraethylene pentamine. Usually it is desirable to stir while reaction is taking place, particularly to prevent localized overheating. If a condensation product is not soluble enough for a particular purpose, either as such or in the form of a salt, such as the lactate, acetate, or the like, then an analogous product should be obtained from a lower molal alcohol or from a polyamine having either (a) more amino nitrogen atoms; (b) more hydroxylated hydrocarbon radicals, such as ethanol radicals; (c) an amine that has both of these characteristics; and (d) employ glycerol or the like as an added reactant as hereinafter described.

Thus, another procedure, hereinafter indicated, will be to add a third reactant, to wit, a polyhydric alcohol, such as glyceryl, ethylene glycol, diethylene, butylene glycol, or the like. Such polyhydric alcohol enters into the condensation reaction in such a manner as to yield a product similar to the kind which would be obtained by treating the selected alcohol with an alkylene oxide, such as ethylene oxide, propylene oxide, or glycidol, prior to reaction with the amine; or if in an analogous manner, the polyhydroxylated amine had been subjected to similar treatment. This type will be illustrated by subsequent examples.

Inversely, in some instances a product may be too soluble, and thus not show maximum surface activity, or may not show optimum demulsifying effect. In such event, the hydrophile character can be decreased by following the reverse of the procedure above enumerated, i. e., (a) use more than one mole of alcohol per mole of polyamine; (b) use a high molal alcohol of an increased molecular weight; (c) use a polyamine having fewer amino nitrogen atoms; (d) use a polyamine having fewer alkylol radicals or the like; (e) eliminate the addition of a polyhydric alcohol, such as glycerine, ethylene glycol, etc., to the reaction mass.

It will be pointed out hereafter that the condensation products themselves may be utilized for other purposes than in connection with the acidization of oil-bearing strata. In order to obtain light-colored condensation products, it is most desirable to use glass-lined apparatus or vessels prepared from suitable non-ferrous alloys. It is most desirable that the reactants be stirred slowly during the polymerization process, and it is usually advantageous to make some arrangement for an elimination of water which may be formed. In the simplest aspect, this is most readily effected by employment of a hot condenser in connection with the reaction vessel. The temperature of such hot condenser is preferably slightly above 100° C. so as to permit the escape of water vapor, but to prevent the loss of any of the reactants by volatilization. In some instances it may be necessary to conduct the reaction for a fairly lond period of time, for instance, 8–20 hours or thereabouts. In many cases it is desirable to react the finished condensation product with some suitable acid, such as lactic acid, acetic acid, or the like, particularly when the condensation product is employed for some purpose other than acidization of calcareous structure.

In order to illustrate the manufacture of such condensation products, attention is directed to the following examples, in which the expression "pound mole" is used to indicate the molecular weight in pounds:

Example 1

A mixture is prepared using one pound mole each of the following: cetyl alcohol and tetraethanol tetraethylene pentamine. The temperature employed is approximately 275° C. The time of reaction is approximately 6–12 hours. The final completion of reaction is indicated by the fact that the product gives a clear solution in dilute acetic acid.

Example 2

Hexaethanol tetraethylene pentamine is substituted for tetraethanol tetraethylene pentamine in Example 1.

Example 3

Normal nonyl alcohol is substituted for cetyl alcohol in Examples 1 and 2.

Example 4

Normal decyl alcohol is substituted for normal nonyl alcohol in the preceding example.

Example 5

Dodecyl alcohol is substituted for nonyl alcohol in Example 3.

Example 6

Tetradecyl alcohol is substituted for nonyl alcohol in Example 3.

Example 7

The examples of the type previously indicated are repeated, with the addition of one pound mole of glycerol for each pound mole of the high molal alcohol.

Example 8

Example 7 is repeated using two pound moles of glycerol in each instance instead of one pound mole.

Example 9

Examples 1–8, inclusive, are repeated, using a temperature of approximately 300–325° C., except in those instances where too much alcohol would be volatilized.

Wherever the term "condensation product" is employed, it will be understood to cover a reaction product between the high molar water-insoluble alcohol, and the hydroxylated polyamine, wherein water or acid or the like is split out as a result of the union of the molecules of the two types of reactants. Similarly, the expression "condensing" is employed to refer specifically to the process whereby such condensation takes place.

All the chemical compounds previously described are water-soluble as such, or when dissolved in dilute acid or acid of the concentration indicated. Such compounds may be combined not only with mineral acids, but also with organic acids, such as acetic acid, lactic, stearic acid, or the like. For this reason they can be used without difficulty in aqueous solution as an emulsion-prevention agent, by injecting such aqueous solution into the oil-bearing strata prior to acidization, or immediately after acidization. Such injection is made by conventional means, as, for example, the same apparatus or mechanical device employed for injecting acid into the well or oil-bearing strata. Furthermore, substantially all the compounds above described are soluble in hydrochloric acid of a strength corresponding to approximately 15%. Furthermore, substantially all the compounds of the type indicated are soluble in concentrated hydrochloric acid. Commercial hydrochloric acid is ordinarily available in grades from approximately 18° Bé., corresponding to approximately 28% anhydrous acid, to 22 Bé., corresponding to approximately 35.2% anhydrous acid. Some commercial hydrochloric acid is available in a strength which approximates the C. P. grade, or slightly less than 37% anhydrous acid.

Needless to say, my new composition of matter can be prepared readily in any convenient form. The expression "new composition of matter" in this present instance is intended to refer to the combination or mixture obtained by combining materials of the kind above described with hydrochloric acid or the like.

The selected compound may be dissolved in concentrated hydrochloric acid without dilution. The percentages employed have already been indicated. Such a concentrated hydrochloric acid may or may not contain some hydrofluoric acid. Likewise, if desired, the emulsion-prevention agent may be dissolved in water, and such aqueous solution added to the hydrochloric acid or the like, in order to dilute the same to the desired concentration. Another procedure, of course, is to add the particular chemical compound which has been selected as the emulsion-preventing agent. The percentage of chemical compound of the kind herein described is added within the range of 0.01% to 5%.

In the hereto appended claims, reference to the use of the condensation product is intended to include the base form, i. e., the chemical combination of water, and also the salt form, such as the lactate, acetate, citrate, or the like.

It has been previously pointed out that in the present instance the expression "new composition of matter" is intended to refer to the combination of a condensation product of the kind described and hydrochloric acid or some other mineral acid. However, as far as I am aware, the condensation product or products herein described are per se new compositions of matter, and more specifically, are cation-active materials. There is a wide variety of uses for surface-active materials. See, for example, U. S. Patent No. 2,174,131, dated September 26, 1939, to Lubs. Some of these purposes are particularly adapted to the use of a cation-active material or a cation-active material which is at least self-emulsifiable. In such instances, materials of the kind herein contemplated, particularly the quaternary ammonium salt type, is specifically suitable. Briefly, then, specific uses for my new product include use as wetting, detergent, and leveling agents in the laundry, textile, and dyeing industry; as wetting agents and detergents in the acid washing of fruit, and in the acid washing of building stone and brick; as a wetting agent and spreader in the application of asphalt in road building and the like; as a constituent of soldering flux preparations; as a flotation reagent in the flotation separation of various minerals; for flocculation and coagulation of various minerals; for flocculation and coagulation of various aqueous suspensions containing negatively charged particles such as sewage, coal washing waste water, and various trade wastes and the like; as germicides, insecticides, and emulsifiers for cosmetics, spray oils, water-repellant textile finish, etc. These uses are by no means exhaustive.

I have found such condensation products per se to be excellent demulsifiers for water-in-oil emulsions, particularly the kind which occur in the production of crude oil and of the kind which occur in desalting procedure as employed in refineries. Such condensation products may also be used as break-inducers in doctor treatment of the kind intended to sweeten gasoline. See U. S. Patent No. 2,157,223, dated May 9, 1939, to Sutton.

Furthermore, such condensation products per se may be employed as intermediates for combination wtih other reactants so as to obtain added products of utility. For instance, such condensation products per se may be reacted with polybasic acids, such as phthalic acid, maleic acid, oxalic acid, succinic acid, adipic acid, and the like, or their fractional salts or fractional esters, such as sodium acid phthalate, octyl acid phthalate, dodecyl acid phthalate, triricinolein monophthalate, triricinolein diphthalate, and the like, to give new compounds or compositions of matter which have utility in various arts previously enumerated.

Having thus described my invention, what I claim as new and desire to secure by Letters Patent is:

1. A process for preventing water-in-oil emulsions resulting from the acidization of calcareous oil-bearing strata, which consists in introducing into the cognate fluids of a well prior to emergence, the condensation product derived from one mole of a hydroxylated polyalkylene amine containing at least one amino nitrogen atom not directly linked to a hydroxy hydrocarbon radical, and at least one mole of a high molal water-insoluble alcohol containing at least 9 carbon atoms and not more than 31 carbon atoms.

2. A process for preventing water-in-oil emulsions resulting from the acidization of calcareous oil-bearing strata, which consists in introducing into the cognate fluids of a well prior to emergence, the condensation product derived from one mole of a hydroxylated polyalkylene amine containing at least one amino nitrogen atom not directly linked to a hydroxy hydrocarbon radical, and at least one mole of a high molal, water-insoluble, aliphatic alcohol containing at least 9 carbon atoms and not more than 31 carbon atoms.

3. A process for preventing water-in-oil emulsions resulting from the acidization of calcareous oil-bearing strata, which consists in introducing into the cognate fluids of a well prior to emergence, the condensation product derived from one mole of a hydroxylated polyalkylene amine containing at least one amino nitrogen atom not directly linked to a hydroxy hydrocarbon radical, and at least one mole of a high molal, water-insoluble, primary aliphatic alcohol containing at least 9 carbon atoms and not more than 31 carbon atoms.

4. A process for preventing water-in-oil emulsions resulting from the acidization of calcareous oil-bearing strata, which consists in introducing into the cognate fluids of a well prior to emergence, the condensation product derived from one mole of a hydroxylated polyalkylene amine containing at least two amino nitrogen atoms not directly linked to a hydroxy hydrocarbon radical, and at least one mole of a high molal, water-insoluble, primary aliphatic alcohol containing at least 9 carbon atoms and not more than 31 carbon atoms.

5. A process for preventing water-in-oil emulsions resulting from the acidization of calcareous oil-bearing strata, which consists in introducing into the cognate fluids of a well prior to emergence, the condensation product derived from one mole of a hydroxylated polyalkylene amine containing at least two amino nitrogen atoms not directly linked to a hydroxy hydrocarbon radical, and one mole of a high molal, water-insoluble, primary aliphatic alcohol containing at least 9 carbon atoms and not more than 31 carbon atoms.

6. A process for preventing water-in-oil emulsions resulting from the acidization of calcareous oil-bearing strata, which consists in introducing into the cognate fluids of a well prior to emergence, the condensation product derived from one mole of a hydroxylated polyalkylene amine containing at least two amino nitrogen atoms not directly linked to a hydroxy hydrocarbon radical, and one mole of a high molal, water-insoluble, primary aliphatic alcohol containing at least 9 carbon atoms and not more than 18 carbon atoms.

7. A process for preventing water-in-oil emulsions resulting from the acidization of calcareous oil-bearing strata, which consists in introducing into the cognate fluids of a well prior to emergence, the condensation product derived from one mole of a hydroxylated polyethylene amine containing at least two amino nitrogen atoms not directly linked to a hydroxy hydrocarbon radical, and one mole of a high molal, water-insoluble, primary aliphatic alcohol containing at least 9 carbon atoms and not more than 18 carbon atoms.

8. A process for preventing water-in-oil emulsions resulting from the acidization of calcareous oil-bearing strata, which consists in introducing into the cognate fluids of a well prior to emergence, the condensation product derived from one mole of tetraethanol tetraethylene pentamine, and one mole of a high molal, water-insoluble, primary aliphatic alcohol containing at least 9 carbon atoms and not more than 18 carbon atoms.

9. A process for preventing water-in-oil emulsions resulting from the acidization of calcareous oil-bearing strata, which consists in introducing into the cognate fluids of a well prior to emergence, the condensation product derived from one mole of a hydroxylated polyalkylene amine containing at least one amino nitrogen atom not directly linked to a hydroxy hydrocarbon radical, at least one mole of a high molal water-insoluble alcohol containing at least 9 carbon atoms and not more than 31 carbon atoms, and at least one mole of a polyhydric alcohol.

10. A process for preventing water-in-oil emulsions resulting from the acidization of calcareous oil-bearing strata, which consists in introducing into the cognate fluids of a well prior to emergence, the condensation product derived from one mole of a hydroxylated polyalkylene amine containing at least one amino nitrogen atom not directly linked to a hydroxy hydrocarbon radical, at least one mole of a high molal, water-insoluble, aliphatic alcohol containing at least 9 carbon atoms and not more than 31 carbon atoms, and at least one mole of a polyhydric alcohol.

11. A process for preventing water-in-oil emulsions resulting from the acidization of calcareous oil-bearing strata, which consists in introducing into the cognate fluids of a well prior to emergence, the condensation product derived from one mole of a hydroxylated polyalkylene amine containing at least one amino nitrogen atom not directly linked to a hydroxy hydrocarbon radical, at least one mole of a high molal, water-insoluble, primary aliphatic alcohol containing at least 9 carbon atoms and not more than 31 carbon atoms, and at least one mole of a polyhydric alcohol.

12. A process for preventing water-in-oil emulsions resulting from the acidization of calcareous oil-bearing strata, which consists in introducing into the cognate fluids of a well prior to emergence, the condensation product derived from one mole of a hydroxylated polyalkylene amine containing at least two amino nitrogen atoms not directly linked to a hydroxy hydrocarbon radical, at least one mole of a high molal, water-insoluble, primary aliphatic alcohol containing at least 9 carbon atoms and not more than 31 carbon atoms, and at least one mole of a polyhydric alcohol.

13. A process for preventing water-in-oil emulsions resulting from the acidization of calcareous oil-bearing strata, which consists in introducing into the cognate fluids of a well prior to emergense, the condensation product derived from one mole of a hydroxylated polyalkylene amine containing at least two amino nitrogen atoms not directly linked to a hydroxy hydrocarbon radical, one mole of a high molal, water-insoluble, primary aliphatic alcohol containing at least 9 carbon atoms and not more than 31 carbon atoms, and at least one mole of a polyhydric alcohol.

14. A process for preventing water-in-oil emulsions resulting from the acidization of calcareous oil-bearing strata, which consists in introducing into the cognate fluids of a well prior to emergence, the condensation product derived from one mole of a hydroxylated polyalkylene amine containing at least two amino nitrogen atoms not directly linked to a hydroxy hydrocarbon radical, one mole of a high molal, water-insoluble, primary aliphatic alcohol containing at least 9 carbon atoms and not more than 18 carbon atoms, and at least one mole of a polyhydric alcohol.

15. A process for preventing water-in-oil emulsions from the acidization of calcareous oil-bearing strata, which consists in introducing into the cognate fluids of a well prior to emergence, the condensation product derived from one mole of a hydroxylated polyethylene amine containing at least two amino nitrogen atoms not directly linked to a hydroxy hydrocarbon radical, one mole of a high molal, water-insoluble, primary aliphatic alcohol containing at least 9 carbon atoms and not more than 18 carbon atoms, and at least one mole of a polyhydric alcohol.

16. A process for preventing water-in-oil emulsions resulting from the acidization of calcareous oil-bearing strata, which consists in introducing into the cognate fluids of a well prior to emergence, the condensation product derived from one mole of tetraethanol tetraethylene pentamine, one mole of a high molal, water-insoluble, primary aliphatic alcohol containing at least 9 carbon atoms and not more than 18 carbon atoms, and at least one mole of a polyhydric alcohol.

17. A new composition of matter, comprising strong mineral acid and the condensation product derived from one mole of a hydroxylated polyalkylene amine containing at least one amino nitrogen atom, not directly linked to a hydroxy hydrocarbon radical, and at least one mole of a high molal water-insoluble alcohol containing at least 9 carbon atoms and not more than 31 carbon atoms.

18. A composition of matter, comprising hydrochloric acid and the condensation product derived from one mole of a hydroxylated polyalkylene amine containing at least one amino nitrogen atom not directly linked to a hydroxy hydrocarbon radical, and at least one mole of a high molal, water-insoluble alcohol containing at least 9 carbon atoms and not more than 31 carbon atoms.

19. A composition of matter, comprising hydrochloric acid and the condensation product derived from one mole of a hydroxylated polyalkylene amine containing at least one amino nitrogen atom not directly linked to a hydroxy hydrocarbon radical, and at least one mole of a high molal, water-insoluble, aliphatic alcohol containing at least 9 carbon atoms and not more than 31 carbon atoms.

20. A composition of matter, comprising hydrochloric acid and the condensation product derived from one mole of a hydroxylated polyalkylene amine containing at least one amino nitrogen atom not directly linked to a hydroxy hydrocarbon radical, and at least one mole of a high molal, water-insoluble, primary aliphatic alcohol containing at least 9 carbon atoms and not more than 31 carbon atoms.

21. A composition of matter, comprising hydrochloric acid and the condensation product derived from one mole of a hydroxylated polyalkylene amine containing at least two amino nitrogen atoms not directly linked to a hydroxy hydrocarbon radical, and at least one mole of a high molal, water-insoluble, primary aliphatic alcohol containing at least 9 carbon atoms and not more than 31 carbon atoms.

22. A composition of matter, comprising hydrochloric acid and the condensation product derived from one mole of a hydroxylated polyalkylene amine containing at least two amino nitrogen atoms not directly linked to a hydroxy hydrocarbon radical, and one mole of a high molal, water-insoluble, primary aliphatic alcohol containing at least 9 carbon atoms and not more than 31 carbon atoms.

23. A composition of matter, comprising hydrochloric acid and the condensation product derived from one mole of a hydroxylated polyalkylene amine containing at least two amino nitrogen atoms not directly linked to a hydroxy hydrocarbon radical, and one mole of a high molal, water-insoluble, primary aliphatic alcohol containing at least 9 carbon atoms and not more than 18 carbon atoms.

24. A composition of matter, comprising hydrochloric acid and the condensation product derived from one mole of a hydroxylated polyethylene amine containing at least two amino nitrogen atoms not directly linked to a hydroxy hydrocarbon radical, and one mole of a high molal, water-insoluble, primary aliphatic alcohol containing at least 9 carbon atoms and not more than 18 carbon atoms.

25. A composition of matter, comprising hydrochloric acid and the condensation product derived from one mole of tetraethanol tetraethylene pentamine, and one mole of a high molal, water-insoluble, primary aliphatic alcohol containing at least 9 carbon atoms and not more than 18 carbon atoms.

26. A composition of matter, comprising strong mineral acid and the condensation product derived from one mole of a hydroxylated polyalkylene amine containing at least one amino nitrogen atom not directly linked to a hydroxy hydrocarbon radical, at least one mole of a high molal, water-insoluble alcohol containing at least 9 carbon atoms and not more than 31 carbon atoms, and at least one mole of a polyhydric alcohol.

27. A composition of matter, comprising hydrochloric acid and the condensation product derived from one mole of a hydroxylated polyalkylene amine containing at least one amino nitrogen atom not directly linked to a hydroxy hydrocarbon radical, at least one mole of a high-molal, water-insoluble alcohol containing at least 9 carbon atoms and not more than 31 carbon atoms, and at least one mole of a polyhydric alcohol.

28. A composition of matter, comprising hydrochloric acid and the condensation product derived from one mole of a hydroxylated polyalkylene amine containing at least one amino nitrogen atom not directly linked to a hydroxy hydrocarbon radical, at least one mole of a high molal, water-insoluble, aliphatic alcohol containing at least 9 carbon atoms and not more than 31 carbon atoms, and at least one mole of a polyhydric alcohol.

29. A composition of matter, comprising hydrochloric acid and the condensation product derived from one mole of a hydroxylated polyalkylene amine containing at least one amino nitrogen atom not directly linked to a hydroxy hydrocarbon radical, at least one mole of a high molal, water-insoluble, primary aliphatic alcohol containing at least 9 carbon atoms and not more than 31 carbon atoms, and at least one mole of a polyhydric alcohol.

30. A composition of matter, comprising hydrochloric acid and the condensation product derived from one mole of a hydroxylated polyalkylene amine containing at least two amino nitrogen atoms not directly linked to a hydroxy hydrocarbon radical, at least one mole of a high molal, water-insoluble, primary aliphatic alcohol containing at least 9 carbon atoms and not more than 31 carbon atoms, and at least one mole of a polyhydric alcohol.

31. A composition of matter, comprising hydrochloric acid and the condensation product derived from one mole of a hydroxylated polyalkylene amine containing at least two amino nitrogen atoms not directly linked to a hydroxy hydrocarbon radical, one mole of a high molal, water-insoluble, primary aliphatic alcohol containing at least 9 carbon atoms and not more than 31 carbon atoms, and at least one mole of a polyhydric alcohol.

32. A composition of matter, comprising hydrochloric acid and the condensation product derived from one mole of a hydroxylated polyalkylene amine containing at least two amino nitrogen atoms not directly linked to a hydroxy hydrocarbon radical, one mole of a high molal, water-insoluble, primary aliphatic alcohol containing at least 9 carbon atoms and not more than 18 carbon atoms, and at least one mole of a polyhydric alcohol.

33. A composition of matter, comprising hydrochloric acid and the condensation product derived from one mole of a hydroxylated polyethylene amine containing at least two amino nitrogen atoms not directly linked to a hydroxy hydrocarbon radical, one mole of a high molal, water-insoluble, primary aliphatic alcohol containing at least 9 carbon atoms and not more than 18 carbon atoms, and at least one mole of a polyhydric alcohol.

34. A composition of matter, comprising hydrochloric acid and the condensation product derived from one mole of tetraethanol tetraethylene pentamine, one mole of a high molal, water-insoluble, primary aliphatic alcohol containing at least 9 carbon atoms and not more than 18 carbon atoms, and at least one mole of a polyhydric alcohol.

MELVIN DE GROOTE.